UNITED STATES PATENT OFFICE.

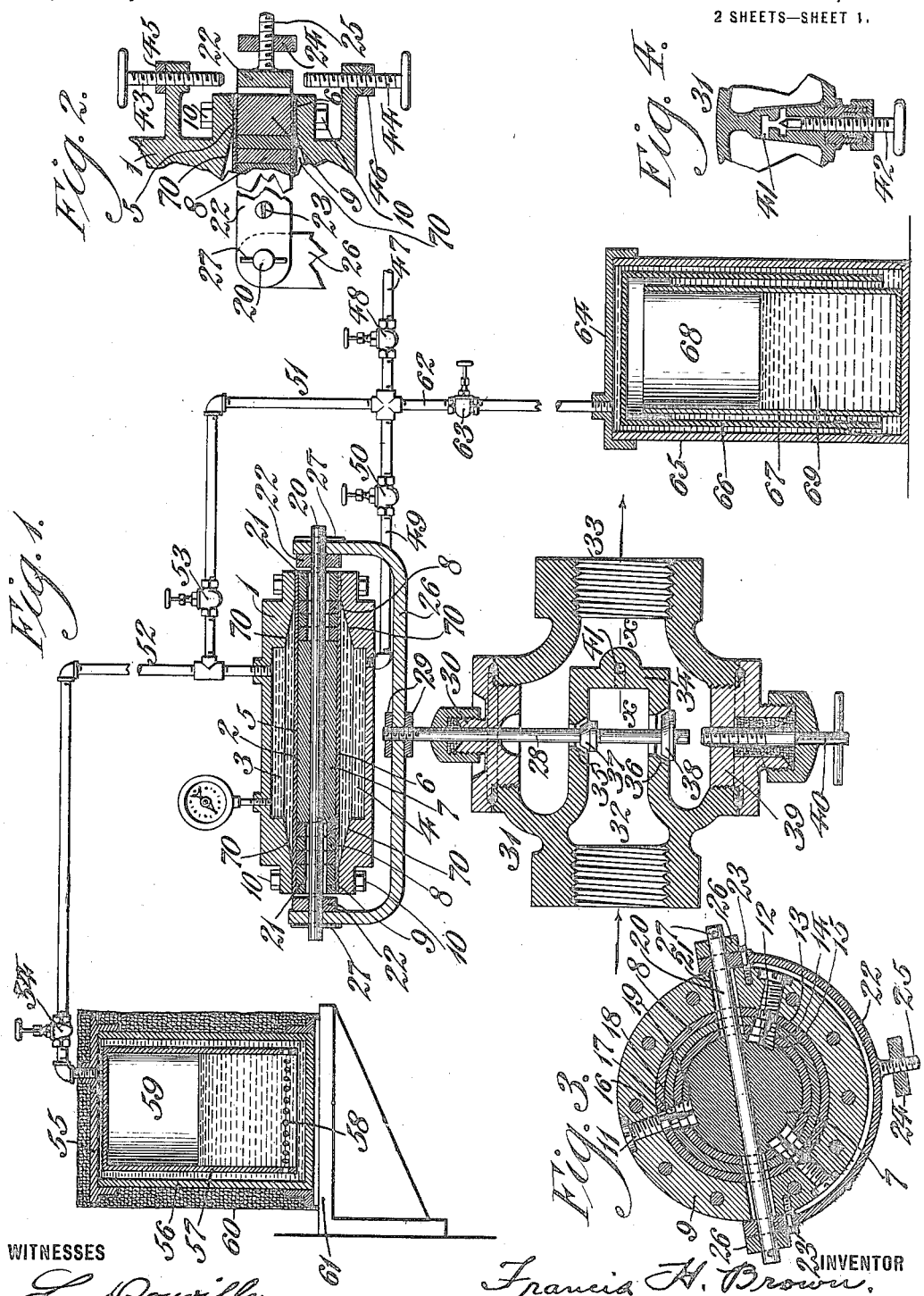

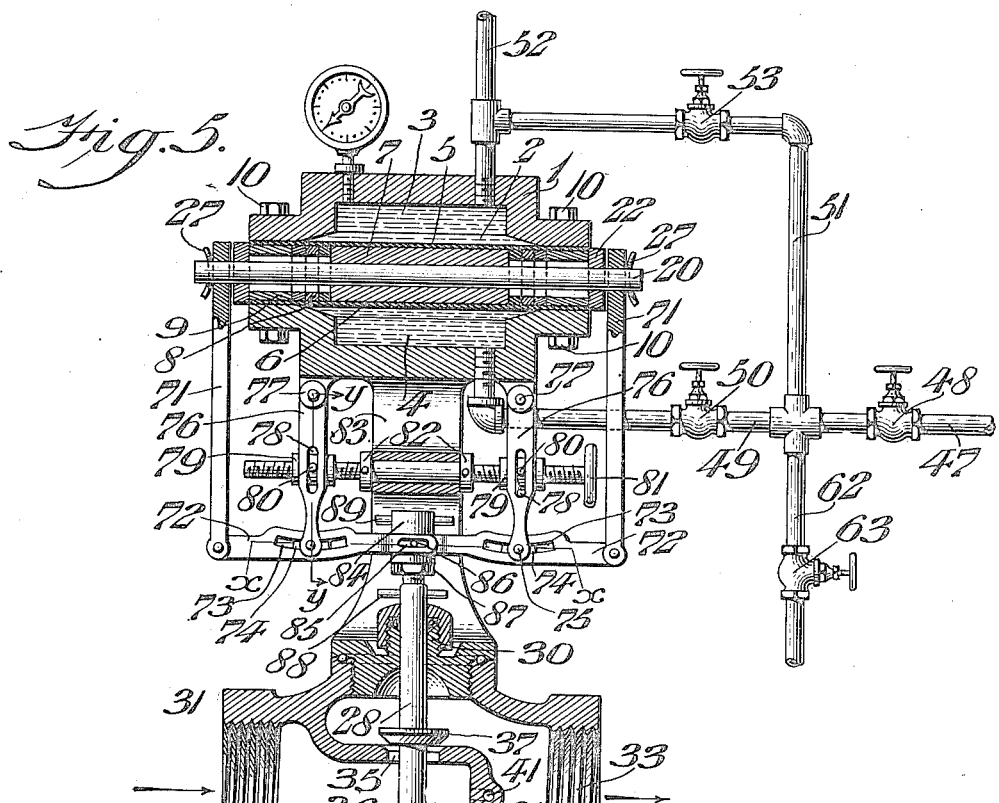

FRANCIS H. BROWN, OF PHILADELPHIA, PENNSYLVANIA.

AUTOMATIC REGULATING MECHANISM.

1,247,216.  Specification of Letters Patent.  Patented Nov. 20, 1917.

Original application filed February 18, 1913, Serial No. 749,067. Divided and this application filed April 18, 1914, Serial No. 832,698. Renewed April 18, 1917. Serial No. 163,035.

*To all whom it may concern:*

Be it known that I, FRANCIS H. BROWN, a citizen of the United States, residing at Philadelphia, in the county of Philadelphia, State of Pennsylvania, have invented a new and useful Automatic Regulating Mechanism, of which the following is a specification.

My present invention consists of a novel regulating mechanism, wherein one side of the movable element is subjected to a substantially constant pressure formed in a novel manner and wherein the other side of said movable element is subjected to a variable pressure, whereby the movement of the movable element can be utilized to control or regulate any desired mechanism.

In a co-pending application filed Feb. 18th, 1913, Serial No. 749,067, and patented April 21st, No. 1,094,116, I have described and generically claimed a novel regulating mechanism which is adapted for a large variety of purposes and my present application, which is a division of said co-pending application, consists of a novel regulating mechanism which provides for an automatic temperature or thermostatic regulation of any desired mechanism, but for convenience of illustration, I have shown the same as operatively connected with a valve in order to illustrate one manner in which my invention may be used.

It further consists of a novel construction and arrangement of a regulating mechanism and novel means for adjusting the same, so that it will operate at any predetermined or desired standard of pressure.

It further consists of a novel regulating mechanism, wherein the stroke of the mechanism controlled may be varied relatively to the movement of the movable element.

Other novel features of construction and advantage will hereinafter appear in the detailed description.

For the purpose of illustrating my invention, I have shown in the accompanying drawings, one form thereof which is at present preferred by me, since the same will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a sectional elevation of a regulating mechanism embodying my invention.

Fig. 2 represents a sectional elevation of a detail thereof.

Fig. 3 represents a sectional plan view of a portion of Fig. 1.

Fig. 4 represents a sectional view of a portion of Fig. 1, the section being taken on line *x—x* of said figure.

Fig. 5 represents a sectional elevation of another embodiment of my invention.

Fig. 6 represents a section on line *x—x* Fig. 5.

Fig. 7 represents a section on line *y—y* Fig. 5.

Similar numerals of reference indicate corresponding parts in the figures.

Referring to the drawings:—Referring first to Figs. 1 to 4 inclusive, 1 designates a casing which may have any desired conformation, and which is provided with a novel type of diaphragm 2 which divides the casing into two chambers 3 and 4, respectively. The diaphragm 2 may be of any desired type, but for the purposes of illustration, has been shown as corresponding to that disclosed in my copending application to which I have hereinbefore referred, and comprises an upper and lower diaphragm 5 and 6, respectively, between which is located a central spacing block 7, independent spacing rings 8, any desired number of which may be employed, and a spacing annulus 9, such parts being secured in assembled position by means of fastening devices 10, which pass through the two diaphragm members 5 and 6 and the spacing annulus 9. 11 designates limiting plugs, see Fig. 3, which are provided with the different diameters 12, 13, 14 and 15, which coöperate respectively with the walls of the apertures 16, 17, 18 and 19, so that the central spacing member 7 has a greater range of movement than the spacing rings 8 outwardly thereof.

20 designates a rod or bar passing through and fixed in the central spacing block 7 and passing through the apertures 21 which are common to the spacing rings 8 in the annulus 9, such apertures 21 being of proper dimensions to provide for the desired movement of the bar 20, so that the movement of the diaphragm 2 will be communicated exterior of the casing 1 and practically eliminate the friction which occurs in all other devices of this character. The bar 20 has mounted thereon the counterbalance 22 which is pivotally connected by means of the pin 23 to the annulus 9 and said counterbalance 22 is provided with an adjustable weight 24, which, in the present instance, is in threaded engagement with an extension 25 forming a part of the counterbalance 22. The bar 20 may be connected with any desired type of mechanism which it is desired to regulate or control, and in order to accomplish one manner of securing such bar with respect to one type of mechanism, I have shown a yoke 26, through the arms of which the bar 20 passes, and any improper movement is prevented by means of the pins 27 passing through said bar 20.

28 designates the valve stem having a threaded end passing through the yoke 26 and provided with nuts 29 located on opposite sides of said bar, whereby said valve stem may be fixed in its adjusted relation with respect to the yoke 26. The valve stem 28 passes through the stuffing box 30 of a valve 31 having an inlet 32 and an outlet 33 between which is located the baffle or diaphragm 34 having the valve ports 35 and 36, respectively, therethrough, with which coöperate the valve heads 37 and 38, respectively. 39 designates a closure provided with a stuffing box and having a rod 40 adjustably carried thereby and in threaded engagement, in the present instance, in order that the valve may be positively closed, or its opening movement limited as desired.

The baffle 34 is also provided with a passage 41 therethrough, see Fig. 4, which is controlled by means of an adjustable valve 42, so that, if desired, when the valves 37 and 38 are closed, fluid may pass from the inlet to the outlet of the valve.

I also provide means for limiting the movement of the diaphragm by providing adjusting screws 43 and 44 carried by the sections of the casing 1 and provided with lock nuts 45 and 46, respectively, the ends of said adjusting screws being in the path of the counterbalance 22. I also provide limiting means for the movement of the diaphragm by beveling the casings, as shown at 70.

47 designates a conduit communicating with a source of fluid supply (not shown) and provided with a controlling valve 48, said conduit 47 also communicating with a conduit 49, which communicates with the chamber 4 and is provided with a controlling valve 50. 51 designates a conduit communicating with the conduits 47 and 49 and also with a conduit 52, which latter communicates with the chamber 3 of the casing 1, and said conduit 51 is provided with a controlling valve 53. The conduit 52 is provided with a controlling valve 54 and communicates through the cover 55 of a casing 56, in which is located a cushion, such as is generically claimed in my copending application to which I have hereinbefore referred.

The casing 56 has located therein an inverted container 57, the lower end of which is open and which is preferably provided in its bottom with a series of apertures 58, and when the device is in operation, a fluid cushion 59 is formed within the container 57. If desired, the casing 56 may be formed of or surrounded by heat insulating material 60. It will be understood that the casing 56 and its adjuncts are mounted on a support 61, located in any desired place.

The conduits 47, 49 and 51 also communicate with a conduit 62 provided with a controlling valve 63 and communicating through the cover 64, in the present instance, with the interior of the outer container 65. Within the outer container 65 is located, in the present instance, an inverted container 66 having its lower end open and said container 66 has located therewithin an upright container 67 of less diameter, in which and in the upper portion of the inverted container 66 is formed a fluid cushion 68. The container 67 is adapted to receive a material 69, which is sensitive to changes in temperature and one example of material which may be employed is mercury.

Referring now to the embodiment seen in Figs. 5, 6 and 7, the construction of the regulator is similar to that already described with reference to the other figures, except that I have shown the bar 20 as being connected in a different manner with the mechanism controlled, so that the travel of the mechanism controlled may vary relatively to the amount of travel imparted to the movable element, such as the diaphragm. Since the construction is the same except as to the manner of connecting the bar 20 with the valve stem 28, I have given corresponding parts the same reference characters. 71 designates arms mounted on the bar or rod 20, and to said arms are pivoted the levers 72, which are provided with the cam slots 73, in which are adapted to move the shoes or slides 74, which latter are connected by the pins 75 with the levers 76, and said levers are pivotally mounted at 77 on the casing 1. These levers 76 are provided with slots 78, into which pins 80 extend, said pins being carried by the threaded collars 79. 81 designates an adjusting screw in threaded engagement with the collars 79, and longitudinal movement of said adjusting screw is prevented by means of the set collars 82, which engage opposite sides of the bracket 83, through which said adjusting screw 81 passes, it being understood that the brackets 83 serve to connect the casing 1 with the valve 31, in the present instance. 84 designates a cap in threaded engagement with the valve stem 28. 85 designates recesses or slots in the forked ends of the levers 72 and into said recesses pass the pins 86 carried by said adjusting cap 84. A lock nut 87 is provided for fixing the cap 84 and the valve stem 28 in their adjusted position. The valve stem has a pin 88 extending therethrough in order that the same will be manually rotated, when desired, and the cap 84 is provided with a pin 89, in order to provide for the manual adjustment of said cap 84.

The operation of my novel regulating mechanism will now be readily apparent, and is as follows:

Referring first to Figs. 1 to 4 inclusive, the valve steam is first moved to closed position ordinarily by causing the limiting stop 40 to engage the valve stem 28 and seat the valve heads. The pressure is then turned on the inlet side of the valve and, in the illustration shown, this pressure is the element which is to be automatically controlled, such as for example, a steam heating system for buildings. All of the valves 48, 63, 50, 53 and 54 are now open and the pressure entering through the conduit 47 is exerted against each side of the diaphragm and against the air cushions 59 and 68. When the desired standard of pressure under which it is desired to operate has been provided, the valves 47 and 53 are closed, thus leaving the chamber 3 in communication with the chamber of the container 56, which is a fixed pressure, while the chamber 4, on the opposite side of the diaphragm 2, is in communication with the interior of the container 65, which forms a variable or controlling pressure. It will now be apparent that any change in temperature at the place where the thermostatic element, consisting of the elements 64 to 69, inclusive, is located, will change the pressure beneath the diaphragm 2, thereby causing the latter to operate and actuate the yoke 26, whereupon the valve stem 28 or any other desired mechanism, will be actuated, and, in the present instance, as illustrated, a valve stem is actuated which controls the flow of fluid through the valve casing 31. If the thermostatic element is located exterior of the building, the temperature within the building will be automatically controlled in accordance with the changes in temperature taking place outside of the building, and it will also be apparent that such element may be located in the building or any portion thereof to automatically control the heating system and maintain a uniform or desired temperature at any place. The throw of the valve may be varied by adjusting the nuts 29 or by adjusting the counterweight 24 or by adjusting the screws 43 or 44 or by adjusting the limiting stop 40, as is apparent, and the valve may also be positively opened or closed by any of the adjustments just mentioned.

In the operation of the embodiment seen in Fig. 6, the desired standard of pressure is set in the same manner as that described with reference to Fig. 1.

I provide, in Fig. 5, means whereby the throw of the valve or other mechanism controlled relative to the travel of the diaphragm may be regulated as desired, so that the movement of the valve will be greater or less than the amount of movement which has been imparted to the diaphragm. This adjustment is made by actuating the adjusting screw 81 to vary the fulcrum points 75 of the levers 72, it being understood that I provide an adjustable or floating fulcrum which moves in the arc of a circle, the center of which is at 77.

It will be understood that in both of the embodiments of my invention, as herein shown, a change of temperature, acting through the bottom wall of the casing 65 and the bottom of the member 67, will effect the material 69, causing it to expand or contract, and acting on the cushion 68, will, through the transmitting medium in the container 65 and conduit 62, cause a corresponding movement of the diaphragm.

My inventon, in its broad and generic scope, is adapted to control automatically any desired mechanism, and any desired type of diaphragm or other movable element or member may be employed, although the type illustrated herein is especially advantageous, as it may be employed in connection with either high or low pressure.

In so far as I am aware, I am a pioneer in the subject-matter of the present invention, and the first in the art to devise a regulating mechanism, in which a fluid cushion is employed in which the pressure against the inner and outer confining wall of such cushion is equal at all degrees of pressure of the transmitting medium, such fluid cushion acting upon one side of a movable element, while the other side thereof is subjected to a pressure controlled by the operation of a temperature changing medium, while the movable element is employed to regulate or control any desired mechanism, and it is to be understood that my claims to such features are to be generically construed as of corresponding scope.

It will be understood that by such construction, the movable element is subjected on one side to a variable pressure formed in a novel manner, and on the opposite side to a substantially constant pressure, having a universal range of adjustment and including a fluid cushion, as herein disclosed.

It will now be apparent that I have devised a novel and useful automatic regulating mechanism, which embodies the features of advantage enumerated as desirable in the statement of the invention and the above description, and while I have, in the present instance, shown and described a preferred embodiment thereof which will give in practice satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In a regulating mechanism, a movable element subjected on one side to a variable pressure and on the opposite side to a substantially constant pressure, said substantially constant pressure being formed by a plurality of non-mixing fluids, said variable pressure being formed by a plurality of non-mixing fluids, one of which latter is sensitive to variation in temperature, and mechanism controlled by said movable element.

2. In a regulating mechanism, a movable element subjected on one side to the pressure exerted by an adjustable fluid cushion, said cushion being formed by a fluid completely surrounded by a transmitting medium acting on said element, and on the opposite side to a variable pressure sensitive to variations in temperature and including a fluid cushion, and mechanism controlled by said movable element.

3. In a regulating mechanism, a movable element subjected on one side to a substantially constant pressure having a universal range of adjustment, a fluid container in communication with the opposite side of said element, and a plurality of inner containers within said fluid container and forming an elastic cushion, one of said inner containers having therein a controlling element sensitive to variations in temperature to vary the pressure exerted against one side of said movable element, in combination with mechanism controlled by said movable element.

4. In a regulating mechanism, a movable element subjected on one side to a substantially constant pressure having a universal range of adjustment, a fluid container in communication with the opposite side of said element, and a plurality of inner containers within said fluid container and forming an elastic cushion, one of said inner containers having therein a controlling element sensitive to variations in temperature to vary the pressure exerted against one side of said movable element, means to fix any desired standard of pressure on opposite sides of said movable element, in combination with mechanism controlled by said movable element.

5. In a regulating mechanism, a movable element subjected on one side to a substantially constant pressure, formed by a transmitting medium surrounding and sealing a fluid cushion, a device responsive to changes in temperature and exerting a variable pressure against the opposite side of said movable element, and mechanism controlled by said movable element.

6. In a regulating mechanism, a movable element subjected on one side to a substantially constant pressure, formed by a transmitting medium surrounding and sealing a fluid cushion, a counterbalance for said movable element, a device responsive to changes in temperature and exerting a variable pressure against the opposite side of said movable element, and mechanism controlled by said movable element.

7. In a regulating mechanism, a movable element subjected on one side to a substantially constant pressure, formed by a transmitting medium surrounding and sealing a fluid cushion, an adjustable counterbalance for said movable element, a device responsive to changes in temperature and exerting a variable pressure against the opposite side of said movable element, and mechanism controlled by said movable element.

8. In a regulating mechanism, a movable element subjected on one side to a substantially constant pressure, formed by a transmitting medium surrounding and sealing a fluid cushion, a counterbalance for said movable element, means to limit the range of movement of said counterbalance, a device responsive to changes in temperature and exerting a variable pressure against the opposite side of said movable element, and mechanism controlled by said movable element.

9. In a regulating mechanism, a movable element subjected on one side to a substantially constant pressure, formed by a transmitting medium surrounding and sealing a fluid cushion, a device responsive to changes in temperature coöperating with said movable element to exert a variable pressure against the opposite side of said movable element, mechanism operatively connected with said movable element to be controlled thereby, and means to limit the range of movement of said movable element.

10. In a regulating mechanism, a movable element subjected on one side to a substantially constant pressure, formed of a transmitting medium surrounding and sealing a fluid cushion, a device responsive to changes in temperature for exerting a variable pressure against the opposite side of said movable element, connections from said movable element, mechanism controlled by said connections, and means to adjust said connections to vary the travel thereof relatively to the travel of said movable element.

FRANCIS H. BROWN.

Witnesses:
H. S. FAIRBANKS,
C. D. McVAY.